R. L. FRINK.
METHOD OF AND APPARATUS FOR REMOVING THE RESIDUAL GLASS FROM VESSELS CONTAINING A BATH OF GLASS.
APPLICATION FILED NOV. 25, 1912.
1,165,962.
Patented Dec. 28, 1915.
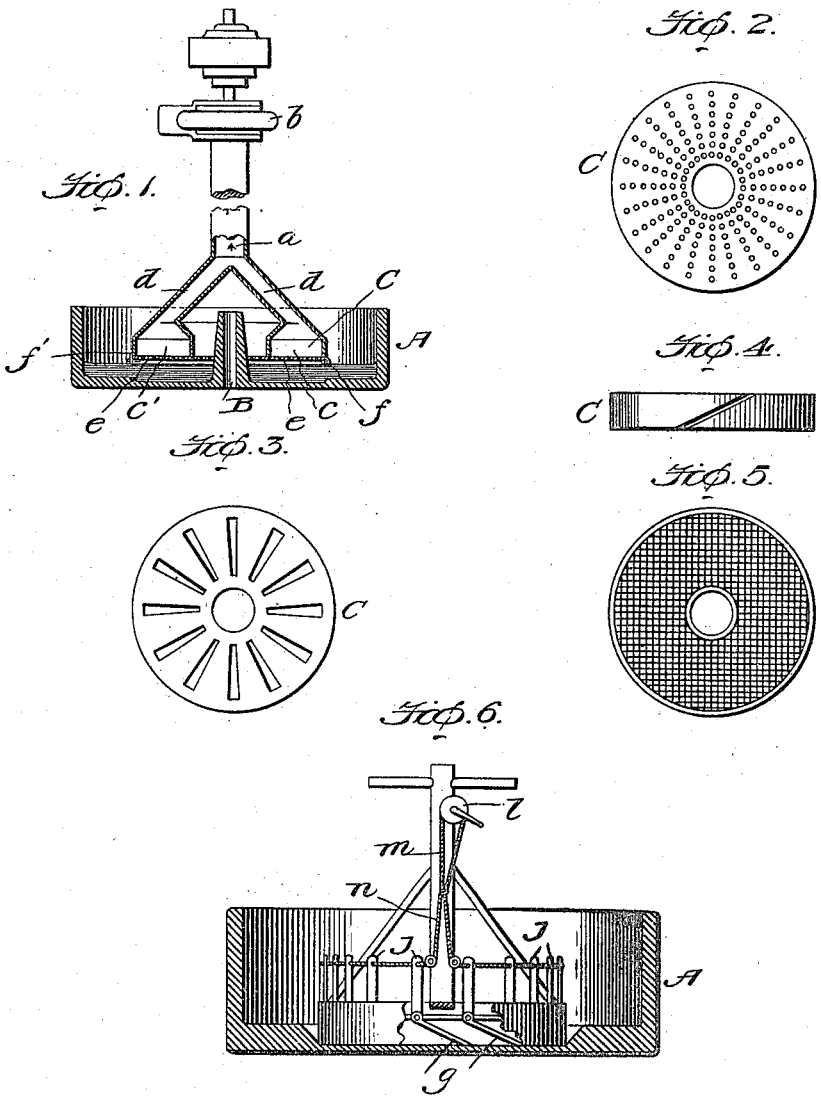
WITNESSES
INVENTOR
Robert L. Frink
Charles C. Stauffer — Attorney

UNITED STATES PATENT OFFICE.

ROBERT L. FRINK, OF LANCASTER, OHIO.

METHOD OF AND APPARATUS FOR REMOVING THE RESIDUAL GLASS FROM VESSELS CONTAINING A BATH OF GLASS.

1,165,962.   Specification of Letters Patent.   Patented Dec. 28, 1915.

Application filed November 25, 1912. Serial No. 733,332.

*To all whom it may concern:*

Be it known that I, ROBERT L. FRINK, a citizen of the United States, residing at Lancaster, in the county of Fairfield and State of Ohio, have invented certain new and useful Improvements in Methods of and Apparatus for Removing the Residual Glass from Vessels Containing a Bath of Glass, of which the following is a specification.

My invention relates to a novel method of and apparatus for removing the residual glass from vessels containing a bath of glass from which glass articles are made, it being well known to those skilled in the art that after an article has been made from a mass of glass contained within the vessel, there remains a portion of the cooled, or semi-cooled, glass upon the surface of the mass which remains in the vessel, and, as is usually the case, this cooled portion constitutes the major portion of the glass which remains. It is well known that unless this remaining portion can be substantially all eliminated from the glass-working vessel, the fresh bath will be contaminated and the quality of the article made therefrom substantially injured by reason of the imperfections introduced into the article, due to this remaining portion, such imperfections being in the form of blisters, cords and the like.

I find that in previous devices there are certain structural faults, operative in efficiencies, or failures in part or wholly to accomplish the end sought, and because of these I have invented and claim a novel means for removing the residual glass.

My invention consists of a rotating skimmer which is forced into the residual mass of glass which is still in the receptacle whereby the glass is made to pass through the perforations to the top of the skimmer. I further provide some agent—it may be the same means in part—for wrenching or pulling the skimmer and its contained glass away from the receptacle and from any glass which may be adherent to the sides or bottom thereof. My object is to take the glass practically all away so the skimmer, in the forms shown, has practically the same area as the inside of the receptacle. The means for forcing the glass through the perforations may vary. I may use atmospheric pressure—suction—or I may use some mechanical agent.

My invention also includes a process. The perforated skimmer is colder than the residual glass. When this glass is broken up into a number of streams by the skimmer, each stream is subjected to a chilling effect. It thus becomes harder than the glass left which is still fluent from the heated receptacle, and these streams of chilled glass though they may either form heads or may coalesce into one mass on the top of the skimmer, are resistant and afford suitable points of application for the wrenching force. My process then consists broadly in breaking the glass to be skimmed into a number of small streams, chilling them and wrenching them free.

The tool which I use is of a size to cover the greater portion of the area from which the glass is to be withdrawn, and I may provide means whereby the glass is withheld in the gathering tool by means other than or in addition to a vacuum, as will be readily recognized by perusal of the following description as specification.

Figure 1 is a view partly in section of that form of device which shows fluid pressure means for forcing the glass into the skimmer; Fig. 2 a view of the bottom of the skimmer. Figs. 3 and 5 views of modifications of the skimmer; Fig. 4 a side view of another modification and Fig. 6 a view of a different means for freeing and lifting the glass.

The glass containing vessel A may be of any shape or character but here I prefer to show the more intricate form as may be used in my process for the making of glass cylinders, in the center of which is the air duct B, and in which the residual glass remains to a depth of perhaps one half inch or more after the completion of a draw. The glass gathering tool, or as I call it, the glass scavenging tool or skimmer C, is lowered into vessel A after the residual glass has been heated to a temperature of reasonable fluidity. By means of the air duct $a$ and air pump $b$ I am able to produce a vacuum in the chamber of the tool as is indicated at the points $c$ and $c'$ of Fig. 1. This chamber is connected to the main air duct $a$ by means of pipes $d$, which also act as supports for the air chamber. The bottom of this chamber is closed by a perforated plate $e$, this plate being held into contact by the hinges and latch $f$ and $f'$. This lower perforated piece, or bottom, is so constructed as to accommodate for the warping which will necessarily ensue from the repeated heating and cooling required to remove the glass both from its surface and perforations, and should be made of some material whose oxid does not freely separate from the metal of which it is formed, I preferring to use copper or nickel, or one of the compounds of nickel and manganese, or nickel and iron, which oxidizes but very little.

The part C is of course much cooler than the glass. It thus has a chilling effect on the streams of glass into which the residual glass is broken when it is forced through the holes. This gives the streams a sort of head—they might fuse together even on top the skimmer, and gives them points of application for the wrenching or pulling force which is applied to tear these streams away from the receptacle and from the viscous layer which sticks to the pot, usually. After the residual glass has been heated to the proper temperature, the scavenging tool or skimmer is lowered so that its bottom surface comes into contact with and passes into the glass, and as rapidly thereafter as is possible a valve in the pipe is opened and the vacuum is formed in the chamber $c$, thereby drawing up through the perforations the glass which is immediately below it. The tool is then wrenched free, removed and carried or swung out away from over the top of the glass containing vessel A. The latch is unfastened and the bottom drops down, thereby causing the glass to fall out into any suitable receiver.

In event any glass shall remain adhering to the tool, it is submerged in water and rapidly cooled, which causes the glass to disengage itself therefrom.

The construction of the bottom portion $e$ may be of any suitable design, I using any one of the several designs here shown in Figs. 2, 3, and 5.

In Fig. 4 the holes are indicated as obliquely placed slots extending from bottom to top. When the scavenging tool or skimmer is brought into contact with the glass, it is given a turn whereby the glass is plowed or torn loose and comes to the top of the part $e$. In Fig. 5 I have indicated the bottom of the part C as made of heavy wire mesh.

Fig. 6 shows another method or means which I may employ in accomplishing the ends above sought, and which consists of blades $g$, or fan-like members setting at an angle, so that by dropping the scavenging tool into the vessel and rotating same in the proper direction, the molten glass will be forced up and inward, and then by means of windlass $l$ and cable $m$ attached to the upper ends J of the levers, these blades may be made to contact with each other, thereby closing the orifice. When it is desired to open them the windlass is turned in the other direction whereupon cable $n$ pulls them back.

Many other forms of designs of apparatus may be used to accomplish the purpose, but what I especially describe and claim is:

1. The method of removing residual glass from a glass-working receptacle which consists in inter-engaging a suitable member with the upper portion of such residual glass; congealing such portion so as to attach the same to said member; and then subjecting such attached portion to a wrenching action, whereby it is separated from the receptacle.

2. The method of removing residual glass from a glass-working receptacle, which consists in causing such residual glass to pass in the form of small streams through a suitable chilling member, whereby the upper portions of such streams are more or less congealed; and then subjecting the glass thus passed to a wrenching action, whereby it is separated from the receptacle.

3. The method of removing residual glass from a glass-working receptacle, which consists in causing such residual glass to pass in the form of small streams through a perforated member adapted to have a chilling action on such streams, whereby the upper portions thereof are more or less congealed; and then subjecting the glass thus passed to a wrenching action, whereby it is separated from the receptacle.

4. The method of removing residual glass from a glass-working receptacle which consists in lowering a suitable perforated member into said receptacle so as to cause such residual glass to pass through the same in the form of small streams, said member being adapted to have a chilling action on such streams, whereby the upper portions thereof are more or less congealed; and then subjecting the glass thus passed to a wrenching action, whereby it is separated from the receptacle.

5. The method of removing residual glass from a glass-working receptacle, which consists in lowering a suitable perforated member into said receptacle, so as to cause such residual glass to pass through the same in the form of small streams, said member being adapted to have a chilling action on such streams, whereby the upper portions thereof are more or less congealed; applying suction to the upper side of said member, so as to assist in causing the glass to pass therethrough; and then subjecting the glass thus passed to a wrenching action, whereby it is separated from the receptacle.

6. A device for removing glass from glass-working vessels, comprising a member movable into and out of such a vessel, said member being formed to inter-engage with any residual glass in such vessel when lowered therein and adapted to have a chilling action on such glass, whereby the upper portion thereof is more or less congealed and attached to said member.

7. A device for removing glass from glass-working vessels, comprising a member in the form of a perforated plate movable into and out of such a vessel, said member being adapted when lowered in said receptacle to cause any residual glass therein to pass through the perforations in said member in the form of small streams, and to have a chilling action on such glass whereby the upper portions of such streams are more or less congealed and thus attached to said member.

8. A device for removing glass from glass-working vessels, comprising a member in the form of a perforated plate movable into and out of such a vessel, said member being adapted when lowered in said receptacle to cause any residual glass therein to pass through the perforations in said member in the form of small streams, and to have a chilling action on such glass whereby the upper portions of such streams are more or less congealed and thus attached to said member; and suction means connected with the upper side of said member so as to assist in causing such glass to pass through the perforations in said member.

9. A device for removing glass from a glass containing receptacle, comprising a perforated skimmer; a hood for said skimmer; a suction fan for said hood, said skimmer being removably attached to said hood; and means adapted to lower said hood and skimmer into the receptacle and into contact with any residual glass therein; and thereupon to withdraw said hood and skimmer, thereby wrenching the latter and its contained glass free from the receptacle.

In testimony whereof I affix my signature in presence of two witnesses.

ROBERT L. FRINK.

Witnesses:
S. C. HILL,
H. F. MOONEY.